(12) United States Patent
Togari et al.

(10) Patent No.: US 11,895,146 B2
(45) Date of Patent: Feb. 6, 2024

(54) INFECTION-SPREADING ATTACK DETECTION SYSTEM AND METHOD, AND PROGRAM

(71) Applicant: Nippon Telegraph and Telephone Corporation, Tokyo (JP)

(72) Inventors: Yukihiro Togari, Tokyo (JP); Hiroaki Maeda, Tokyo (JP); Hisashi Kojima, Tokyo (JP); Takeshi Kuwahara, Tokyo (JP)

(73) Assignee: Nippon Telegraph and Telephone Corporation

( * ) Notice: Subject to any disclaimer, the term of this patent is extended or adjusted under 35 U.S.C. 154(b) by 697 days.

(21) Appl. No.: 15/734,669

(22) PCT Filed: Jun. 3, 2019

(86) PCT No.: PCT/JP2019/021909
§ 371 (c)(1),
(2) Date: Dec. 3, 2020

(87) PCT Pub. No.: WO2019/235403
PCT Pub. Date: Dec. 12, 2019

(65) Prior Publication Data
US 2021/0234871 A1    Jul. 29, 2021

(30) Foreign Application Priority Data

Jun. 4, 2018  (JP) ................................ 2018-107052

(51) Int. Cl.
*H04L 9/40* (2022.01)
(52) U.S. Cl.
CPC ........ *H04L 63/145* (2013.01); *H04L 63/1425* (2013.01); *H04L 63/1433* (2013.01)

(58) Field of Classification Search
CPC .................. H04L 63/145; H04L 63/1425; H04L 63/1433
See application file for complete search history.

(56) References Cited

U.S. PATENT DOCUMENTS 7,356,585 B1 * 4/2008 Brook ................. H04L 63/1416
  709/227
7,613,755 B1 * 11/2009 Venkatachary ..... H04L 63/1416
  708/212

(Continued)

OTHER PUBLICATIONS

Togari et al., "A Study of Infection Attack Detection Mechanism on Carrier Networks Considering False Positive Reduction," IEICE Technical Report, Jun. 7, 2018, 118(88):37-42, 13 pages (with English translation).

(Continued)

Primary Examiner — Khang Do
(74) Attorney, Agent, or Firm — Fish & Richardson P.C.

(57) ABSTRACT

Provided is an infection-spreading attack detection system and method, as well as a program enabling an occurrence of an infection-spreading attack to be detected with high accuracy. A first feature amount is calculated based on traffic information on a packet transferred by a transfer device, and M partial address space(s) are identified to be a monitoring target based on the first feature amount. A second feature amount is calculated for each of the M partial address space(s) based on the traffic information related to the M partial address space(s). Abnormality detection determination is performed on each of the M partial address space(s) based on the second feature amount. Whether the infection-spreading attack has occurred is determined by evaluating M determination results.

18 Claims, 20 Drawing Sheets

(56) References Cited

U.S. PATENT DOCUMENTS

| | | | | |
|---|---|---|---|---|
| 7,917,649 | B2* | 3/2011 | Soukup | H04L 43/18 709/224 |
| 8,331,251 | B2* | 12/2012 | Suzuki | H04L 63/1425 370/395.31 |
| 10,397,248 | B2* | 8/2019 | Yamada | H04L 63/1416 |
| 2002/0147925 | A1* | 10/2002 | Lingafelt | H04L 63/101 713/153 |
| 2003/0014664 | A1* | 1/2003 | Hentunen | H04L 63/1416 726/23 |
| 2005/0204171 | A1* | 9/2005 | Belenky | H04L 63/1441 726/5 |
| 2009/0319659 | A1* | 12/2009 | Terasaki | H04L 63/1416 709/224 |
| 2013/0055404 | A1* | 2/2013 | Khalili | G06Q 10/06312 726/25 |
| 2016/0020969 | A1* | 1/2016 | Vasseur | H04L 43/062 370/252 |
| 2016/0028751 | A1* | 1/2016 | Cruz Mota | H04L 63/1408 726/23 |
| 2016/0261465 | A1* | 9/2016 | Gupta | H04L 43/08 |
| 2017/0208080 | A1* | 7/2017 | Sakamoto | G06N 20/00 |
| 2018/0176248 | A1* | 6/2018 | Nikravesh | H04L 63/1458 |
| 2018/0322284 | A1* | 11/2018 | Chiang | G06F 21/577 |
| 2019/0245832 | A1* | 8/2019 | Liu | G06F 21/602 |
| 2019/0297056 | A1* | 9/2019 | Chiang | H04L 63/1466 |
| 2020/0396201 | A1* | 12/2020 | Du | H04L 63/1425 |

OTHER PUBLICATIONS

Koyama, "IoT Security as a Measure Against Cyber Attacks," NTT Communications Corporation, Mar. 8, 2017, 21 pages (with English Translation).

Togari et al., "A Study on Detection of Outbreak Attacks on Telecommunications Carriers' Networks—A Study of Reasonable Intrusion Detection on a Carrier Network," 2017 IEICE Communications Society Conference, Sep. 12, 2017, p. 73, 4 pages (with English Translation).

Yamauchi et al., "Evaluation of Machine Learning Techniques for C & C Traffic Classification," Information Processing Society of Japan Journal, Sep. 2015, 56(9): 1745-1753, 19 pages (with English Translation).

\* cited by examiner

Fig. 1

```
(1st ROW)  0. 0. 0. 0/8    ANY
(2nd ROW)  1. 0. 0. 0/8    ANY
(3rd ROW)  2. 0. 0. 0/8    ANY

...

(256th ROW) 256. 0. 0. 0/8   ANY
```
(ACL FOR FIRST FEATURE AMOUNT)

```
(1st ROW)  1. 0. 0. 0/8     ANY
(2nd ROW)  14. 0. 0. 0/8    ANY
(3rd ROW)  28. 0. 0. 0/8    ANY

...

(10th ROW)    28. 0. 0. 0/8   ANY
```
(ACL FOR SECOND FEATURE AMOUNT)

Fig. 3

| PARAMETER NAME | PARAMETER VALUE |
|---|---|
| ACQUISITION TIME FOR INFORMATION USED FOR GENERATING FEATURE AMOUNT | 300 SEC |
| FEATURE AMOUNT A | NUMBER OF TRANSMITTED PACKETS PER ACQUISITION TIME |
| FEATURE AMOUNT B | MOVING AVERAGE OF NUMBER OF TRANSMITTED PACKETS INCLUDING NUMBER IN PAST TIME SEQUENCE |
| ... | ... |

Fig. 9

| ADDRESS SPACE | TIME SEQUENCE 1 | TIME SEQUENCE 2 | ... |
|---|---|---|---|
| x.0.0.0/8 | 8 | 2 | |
| y.0.0.0/8 | 10 | 1 | |
| ... | | | |

Fig. 10

| ITEMS | SETTING CONTENT |
|---|---|
| TRAFFIC AMOUNT THRESHOLD | X= 400 PACKETS (PER TIME WIDTH) |
| NUMBER OF ADDRESS SPACES, AMONG A GROUP OF ADDRESS SPACES ENABLING EFFECTIVE DETECTION, FOR WHICH ABNORMALITY DETECTION IS PERFORMED | M = 10 |
| ... | ... |

Fig. 12

| ADDRESS SPACE | TIME SEQUENCE 1 | TIME SEQUENCE 2 | ... |
|---|---|---|---|
| x.0.0.0/8 | 15 | 4 | |
| y.0.0.0/8 | 12 | 11 | |
| ... | | | |

Fig. 14

| ITEMS | SETTING CONTENT |
|---|---|
| ALGORITHM | One Class SVM |
| NUMBER OF TIME SEQUENCES USED FOR LEARNING | T = 100 |
| ALGORITHM HYPERPARAMETER 1 | σ = 100 |
| ... | ... |
| ALGORITHM HYPERPARAMETER P | P = 0.02 |

Fig. 15

| ITEMS | SETTING CONTENT |
|---|---|
| NUMBER OF ADDRESS SPACES TO FOR WHICH ABNORMAL DETECTION IS PERFORMED | M = 10 |
| THRESHOLD OF ATTACK DETERMINATION | N = 2 |
| ... | ... |

Fig. 17

INFECTION-SPREADING ATTACK DETECTION SYSTEM AND METHOD, AND PROGRAM

CROSS-REFERENCE TO RELATED APPLICATIONS

This application is a National Stage application under 35 U.S.C. § 371 of International Application No. PCT/JP2019/021909, having an International Filing Date of Jun. 3, 2019, which claims priority to Japanese Application Serial No. 2018-107052, filed on Jun. 4, 2018. The disclosure of the prior application is considered part of the disclosure of this application, and is incorporated in its entirety into this application

TECHNICAL FIELD

The present invention relates to an infection-spreading attack detection system that detects an infection-spreading attack from an infected terminal in a network.

BACKGROUND ART

In recent years, increased popularity of Internet of Things (IoT) has led to increased opportunities of terminals being connected to the Internet without security measures due to insufficient computational resources. In addition, the number of terminals used by each user is increasing, and thus poorly managed terminals are also anticipated to increase.

Meanwhile, in recent years, there has been an increase in cases where attackers take over the above-described vulnerable user terminals through the Internet to abuse them as a springboard for their cyberattacking, resulting large scale cyberattacks such as Denial of Service (DDoS) of several Tbps class attacking being observed. If a large number of terminals continues to be infected by malware, which is exploited by the attackers as a springboard, it may be a threat to the network bandwidth or may impose a large load on the security mechanism of defenders in the future (see NPL1).

A conventional system has been proposed to detect an attack using a terminal with insufficient security measure or user management on a carrier network as the springboard (hereinafter, referred to as "infection-spreading attack"), in an aim to prevent such a terminal to be used as the springboard on the carrier network for improving security of user terminals and preventing large scale cyberattacks in advance (see NPL 2). This system detects unauthorized communications by infected terminals on a carrier network to figure out the pattern and amount of attack to be made, thereby alleviating the security risk of communication carriers. Examples of the infection-spreading attack include infection activities of Telnet, worms, and the like.

The system described in NPL 2 will now be described. First of all, (1) this system acquires traffic information for each of the subdivided partial address spaces over time by using Access Control List (ACL) in a core router in a carrier network. Examples of subdivision of an address space include a method of subdividing, in the case of IPv4 packets, a 32-bit address space by using a value of the top 8 bits. The acquired traffic information includes the number of packets in every predetermined sampling time. Note that in the ACL, a condition for controlling packets, and a method of controlling packets matching the condition such as an address are described.

Next, (2) the traffic information acquired over time is aggregated within a predetermined aggregation time range for each partial address space, and the traffic information for each partial address space aggregated is vectorized. The vector obtained by this processing is of a scalar value with the dimensionality corresponding to the number of subdivided partial address spaces, and with the elements being the aggregated traffic information. Then, (3) using this vectorized traffic information, machine learning processing is executed by non-supervised learning to create an identifier (threshold).

Next, (4) when performing the detection, the vectorized traffic information at a certain time point is acquired in the same manner as in the aforementioned (1) and (2). Then, the identifier is used to determine whether the traffic information is normal or abnormal. Thus, the infection-spreading attack can be detected. When the infection-spreading attack is detected, a core router is set so that packets thereafter serve as a predetermined security device. Then, in the security device, more detailed analysis is performed, and identification of the terminal making the infection-spreading attack and the like are performed.

A low traffic amount space is known to involve a relatively large amount of communications related to the infection-spreading attack with respect to normal communications. Thus, the system described above is anticipated to further enable recognition of a change due to a small amount of attack.

CITATION LIST

Non Patent Literature

NPL1: Satoru Koyama "IoT security as measure against cyberattacks" [online] Cyber security task force (second session); MIC, [Searched May 11, 30], Internet <URL: http://www.soumu.go.jp/main_content/000471279.pdf>

NPL2: Hiroshi Hoyuki, Hiroaki Maeda, Hisashi Kojima, Yoshiko Sueda "Notes on large scale infection-spreading attack in carrier network" IEICE, Society Conference, 2017

NPL3: Kazumasa Yamauchi and three others, "Evaluation of machine learning method for C&C traffic classification", IPSL Journal Vol. 56, No. 9, 1745 to 1753, September 2015

SUMMARY OF THE INVENTION

Technical Problem

Unfortunately, the conventional system described above is susceptible to noise occurring in an address space with a small amount of traffic, leading to a problem of frequent erroneous detection. An increase in the erroneous detection leads to an increase in the number of times the traffic flows to the security device, resulting in a problem that a large number of security devices need to be provided. Note that examples of noise include traffic related to normal communications not in learning data (e.g., Web browsing or Peer to Peer (P2P) communications). This traffic causes an event where the traffic is determined to be abnormal only because it is not in the learning data, despite the fact that the traffic actually corresponds to normal communications. Noise in machine learning is discussed in NPL3.

The present invention is made in view of the above, and an object of the present invention is to provide an infection-spreading attack detection system and method, as well as a program enabling the occurrence of an infection-spreading attack to be detected with high accuracy.

Means for Solving the Problem

The invention of the present application for achieving the object described above is an infection-spreading attack detection system for detecting an occurrence of an infection-spreading attack in a network including a transfer device that transfers a packet, the infection-spreading attack detection system including: a first feature amount derivation unit configured to acquire first traffic information on the packet transferred by the transfer device, and to derive based on the first traffic information a first feature amount of traffic for each of a plurality of partial address formed by subdividing an address space of the packet; a monitoring target determination unit configured to determine based on the first feature amount derived by the first feature amount derivation unit M partial address space(s) to be a monitoring target out of the plurality of partial address spaces;

a second feature amount derivation unit configured to acquire second traffic information on the packet transferred by the transfer device having, as a destination or a source, an address within the M partial address space(s) determined by the monitoring target determination unit, and to derive based on the second traffic information a second feature amount of the traffic for each of the M partial address space(s); and a detection unit configured to determine whether the second feature amount derived by the second feature amount derivation unit satisfies a predetermined detection condition for each of the M partial address space(s), and, by evaluating M determination results to determine whether an infection-spreading attack has occurred.

Effects of the Invention

According to the present invention, the partial address spaces to be a monitoring target are narrowed down to M partial address space(s) based on the first feature amount derived from the traffic information. Then, for each of M second feature amounts derived from the traffic information of the respective partial address spaces that were narrowed down, whether the detection condition is satisfied is determined. By evaluating this determination result, whether an infection-spreading attack has occurred is determined. Thus, the occurrence of erroneous detection can be reduced as long as no noise occurs simultaneously in a plurality of partial address spaces. Thus, occurrence of the infection-spreading attack can be detected with high accuracy.

BRIEF DESCRIPTION OF DRAWINGS

FIG. 1 is a diagram illustrating an overview of an infection-spreading attack detection system according to the present invention.

FIG. 3 illustrates examples of an ACL set to a packet transfer device.

FIG. 9 illustrates an example of a feature setting information table.

FIG. 10 illustrates an example of a feature holding table.

FIG. 12 illustrates an example of an analysis setting information table.

FIG. 14 illustrates an example of a threshold holding table.

FIG. 15 illustrates an example of a feature setting information table.

FIG. 17 illustrates an example of a feature setting information table.

DESCRIPTION OF EMBODIMENTS

Figure 1:
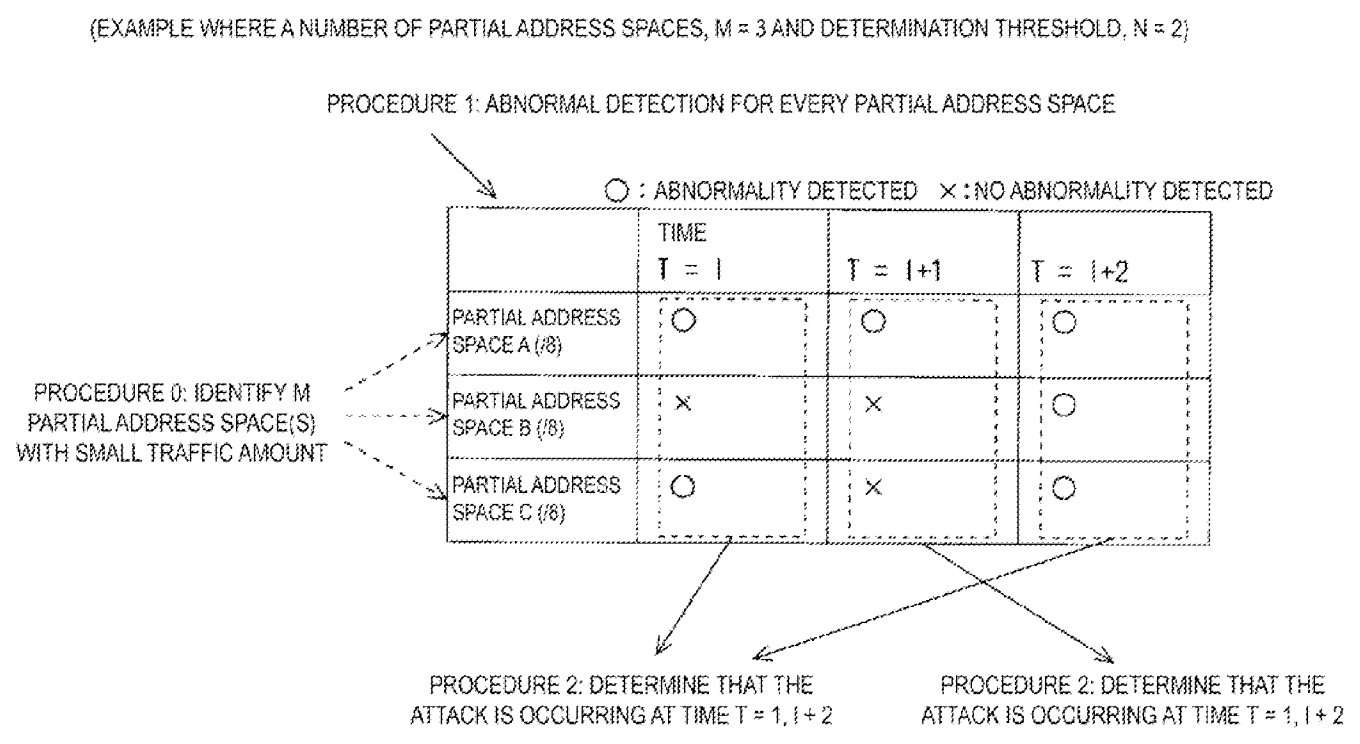
Figure 2:
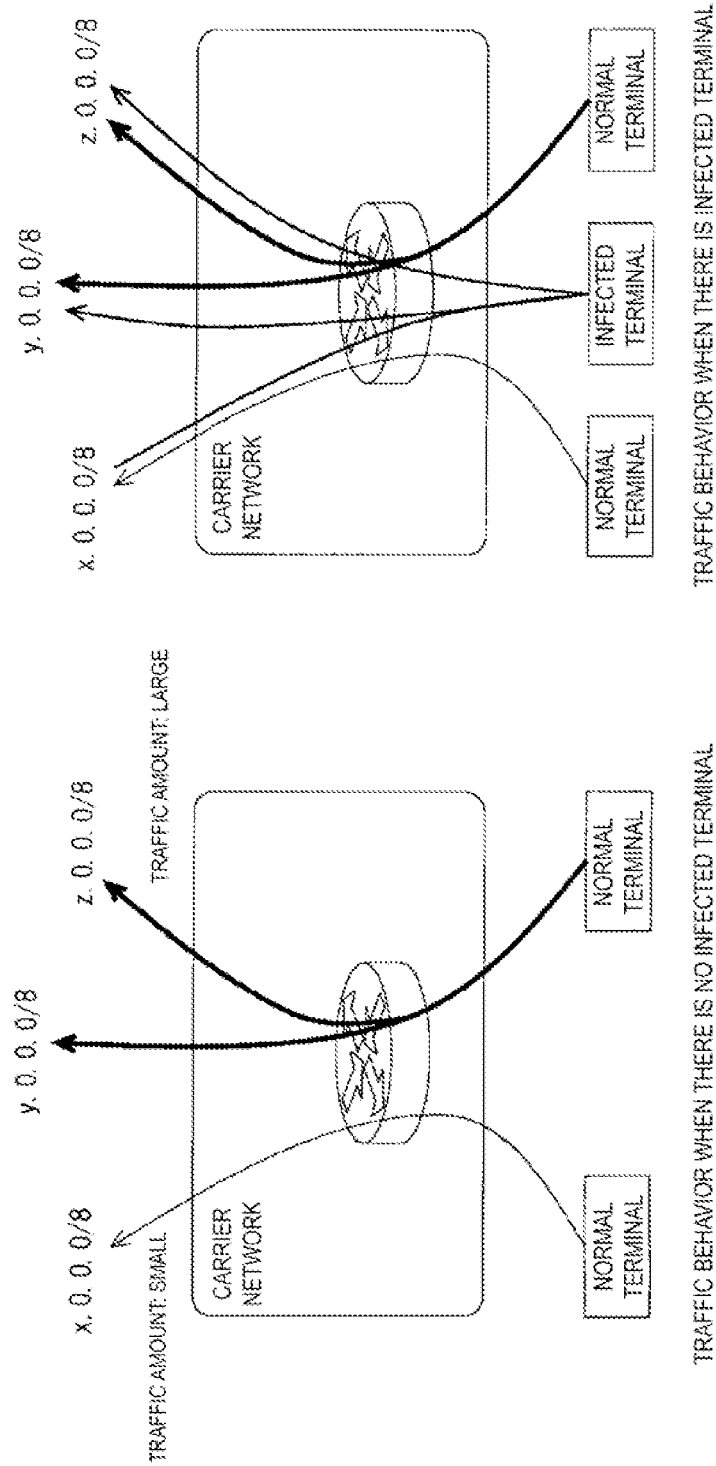
FIG. 2 is a diagram illustrating an example of a partial address space enabling effective detection.

First of all, an overview of an infection-spreading attack detection system according to the present invention will be described with reference to FIG. 1. The detection target in the present invention is an infection-spreading attack on the entire address spaces made by a malware infected terminal accommodated in a network such as a carrier network. The present invention takes advantage of a condition where various protocols are utilized in communications related to an infection-spreading attack. The present invention also takes advantage of a condition that, when the traffic is observed for a plurality of partial address spaces formed by subdividing an address space, normal communications are less likely to occur simultaneously across a plurality of independent partial address spaces, whereas the infection-spreading attack occurs simultaneously across a plurality of partial address spaces.

General procedure for identifying an infected terminal in an infection-spreading attack detection system according to the present invention is as follows (see FIG. 1).

Procedure 0: In a plurality of partial address spaces obtained by subdividing an entire address space, M partial address space(s) enabling effective detection are identified as monitoring targets.

Procedure 1: Abnormality detection determination is performed for each of M partial address space(s) at a predetermined time interval.

Procedure 2: If N partial address space(s), where (N≤M), is determined to be abnormal, it is determined that an infection-spreading attack is occurring.

Procedure 3: For all traffic of communications having, as a destination or source, an address within M partial address space(s), have it sent to a predetermined security device and conduct careful examination to identify an infected terminal that is the source of the attack.

If the value of the number M of partial address space(s) to be identified as a monitoring target in the above procedure 0 is large, the range of the address spaces in which the attack can be effectively monitored is vast, whereby the occurrence of attack can be detected with high accuracy. In addition, the interval at which the abnormality detection determination is performed in the procedure 1 can be determined based on, for example, the average duration of attack from the infected terminal as the detection target. Furthermore, if the value of the threshold N for determining whether an infection-spreading attack is occurring in the procedure 2 is large, erroneous detection is less likely to occur, whereas it may also lead to a reduced detection rate. Thus, as an example of a method of setting the parameter N, a smallest possible N may be set based on the tolerable erroneous detection rate.

Examples of subdivision of address spaces in the procedure 0 include a method of subdividing, in the case of IPv4 packets, a 32-bit address space by using a value of the top 8 bits or 16 bits. Note that 8 bits are preferable as a reference address space granularity. Other methods of subdivision may include subdivision for each routing, such as a full route. This method is not particularly limited.

An example of a partial address space enabling effective detection and a method of identifying the partial address space will be described with reference to FIG. 2. FIG. 2 is a diagram illustrating an example of a partial address space enabling effective detection. Diagram on the left in FIG. 2 illustrates a traffic behavior during normal communications, that is, in a state without infection-spreading attack. On the other hand, on the right in FIG. 2 illustrates a traffic behavior in a state under the infection-spreading attack.

As illustrated on the left in FIG. 2, destination addresses involved in communications of a normal user terminal are not under an equal condition, meaning that there are an address space (e.g., y.0.0.0/8, z.0.0.0/8) with a large amount of traffic and an address space with a small amount of traffic (x.0.0.0/8). On the other hand, as illustrated on the right, the infection-spreading attack by the infected terminal is performed randomly in many cases, with the attack made on a plurality of address spaces. In this context, effective detection can be achieved by focusing on a change in the address space with a small amount of traffic. The present invention takes advantage of such properties.

M partial address space(s) with a small amount of traffic can be identified based on a first feature amount derived from traffic information in a partial address space within a predetermined period. For this identification processing, statistical methods, a clustering algorithm such as a K-Means, and the like can be used as necessary. For example, the number of transmitted packets may be employed as the first feature, and M partial address space(s) with the smallest average number of transmitted packets, that is, predetermined M partial address space(s) with a relatively smaller amount of traffic may be set as monitoring targets. As another method, the number of transmitted packets may be employed as the first feature amount, and all partial address spaces with the first feature amount falling below a threshold X can be set as the monitoring targets. In this case, the number M of the partial address space(s) set to be the monitoring targets is determined at the time of the identification. Note that the threshold X may be an absolute value or a relative value. An example of the threshold X of a relative value includes a value obtained by calculating an average value of the numbers of transmitted packets in the entire address spaces within a predetermined period, and multiplying this average value by a predetermined coefficient (e.g., 1/10).

In the abnormality detection determination of the above-described procedure 1, a second feature amount is derived for each partial address space based on traffic information in the M partial address space(s), and the abnormality detection determination is performed based on this second feature. For this abnormality detection determination, a known statistical technique or machine learning technique may be employed. Examples of the second feature amount include the number of traffic-related packets, a moving average of the number of traffic-related packets over time, and the like. Note that the first feature amount and the second feature amount may be the same or different from each other. Furthermore, the abnormality detection of the above-described procedure 1 is performed for each network device, such as a core router, provided in the network. Detailed examples of the second feature amount will be described later.

As described above, in the above-described procedure 0, the first feature amount is derived based on the traffic information in a partial address space, whereas in the above-described procedure 1, the first feature amount is derived based on the traffic information in the M partial address space(s). The traffic information required in each procedure is obtained from a network device such as a core router that is provided in the network and transfers packets related to communication traffic between a terminal accommodated in the network and the Internet side. For example, for the network device, an ACL for acquiring the traffic information required for deriving the first feature amount may be set first, and after the M partial address space(s) have been identified, an ACL for acquiring traffic information required for deriving the second feature amount may be set. The network device to which the ACL is set aggregates the number of packets matching the conditions of the ACL in each predetermined sampling time, and a value as a result of the aggregation is used as the traffic information.

The ACL setting may be different among network devices. In addition, the direction and interface of the traffic for which the ACL is set are not particularly limited.

FIG. 3 illustrates an example of an ACL. On the left in FIG. 3, an ACL for acquiring the traffic information required to calculate the first feature amount is illustrated. The traffic information required to calculate the first feature amount may be acquired by comprehensively setting up the ACL so that the traffic information (e.g., the number of transmitted packets) of all the destination address spaces can be recognized. On the other hand, on the right in FIG. 3, an ACL for acquiring the traffic information required to calculate the second feature amount is illustrated. The traffic information required to calculate the second feature amount may be acquired by setting up the ACL including description on only the M address space(s) enabling effective detection. Note that the traffic information for deriving the first feature amount and the traffic information for deriving the second feature amount may be different from each other in terms of the type and the number of information pieces. For example, the traffic information for deriving the second feature amount may include information other than the address information included in the header of the packet, such as the SYN packet count, and the port number.

Figure 4:
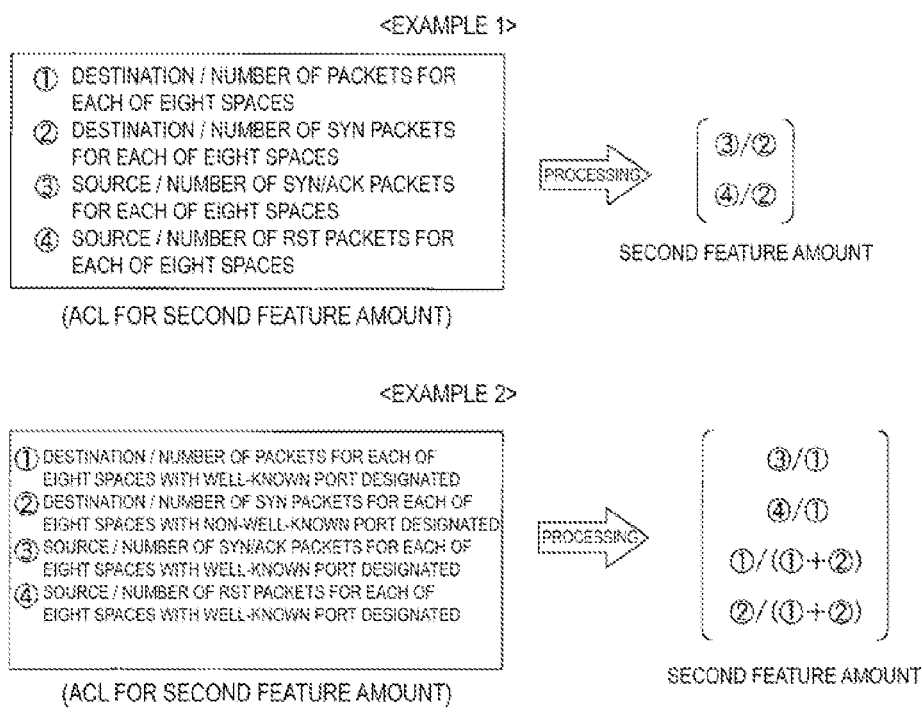
FIG. 4 is an example of processing of traffic information to a second feature amount.

Referring now to FIG. 4, an example of the traffic information for deriving the second feature amount and the second feature amount will be described. The second feature amount may be a scalar value derived from the traffic information in the partial address space or may be a vector value. In the example illustrated in the upper side of FIG. 4, for a partial address space, as the traffic information for deriving the second feature amount, a total of four pieces of traffic information are acquired with destination addresses and source addresses distinguished from each other, and with further distinction made based on the presence of SYN, ACK, and RST flags. The second feature amount is derived by deriving two values from the four pieces traffic information using a predetermined function, and performing processing to derive a vector value with each of these values serving as a scalar element. Similarly in the example illustrated in the lower side of FIG. 4, for a partial address space, as the traffic information for deriving the second feature amount, a total of four pieces of traffic information are acquired with destination addresses and source addresses distinguished from each other, and with further distinction made based on whether the port number indicates a well-known port and based on the presence of SYN, ACK, and RST flags. The second feature amount is derived by deriving four values from the four pieces of traffic information using a predetermined function, and performing processing to derive a vector value with each of these values serving as a scalar element. A simple example of the second feature amount is a scalar value such as a moving average of the number of transmitted packets within a predetermined time. Thus, the traffic information for deriving the first or the second feature amounts may not only include the destination address or the source address of the packet, but may also include other information included in the header of the packet.

Figure 5:
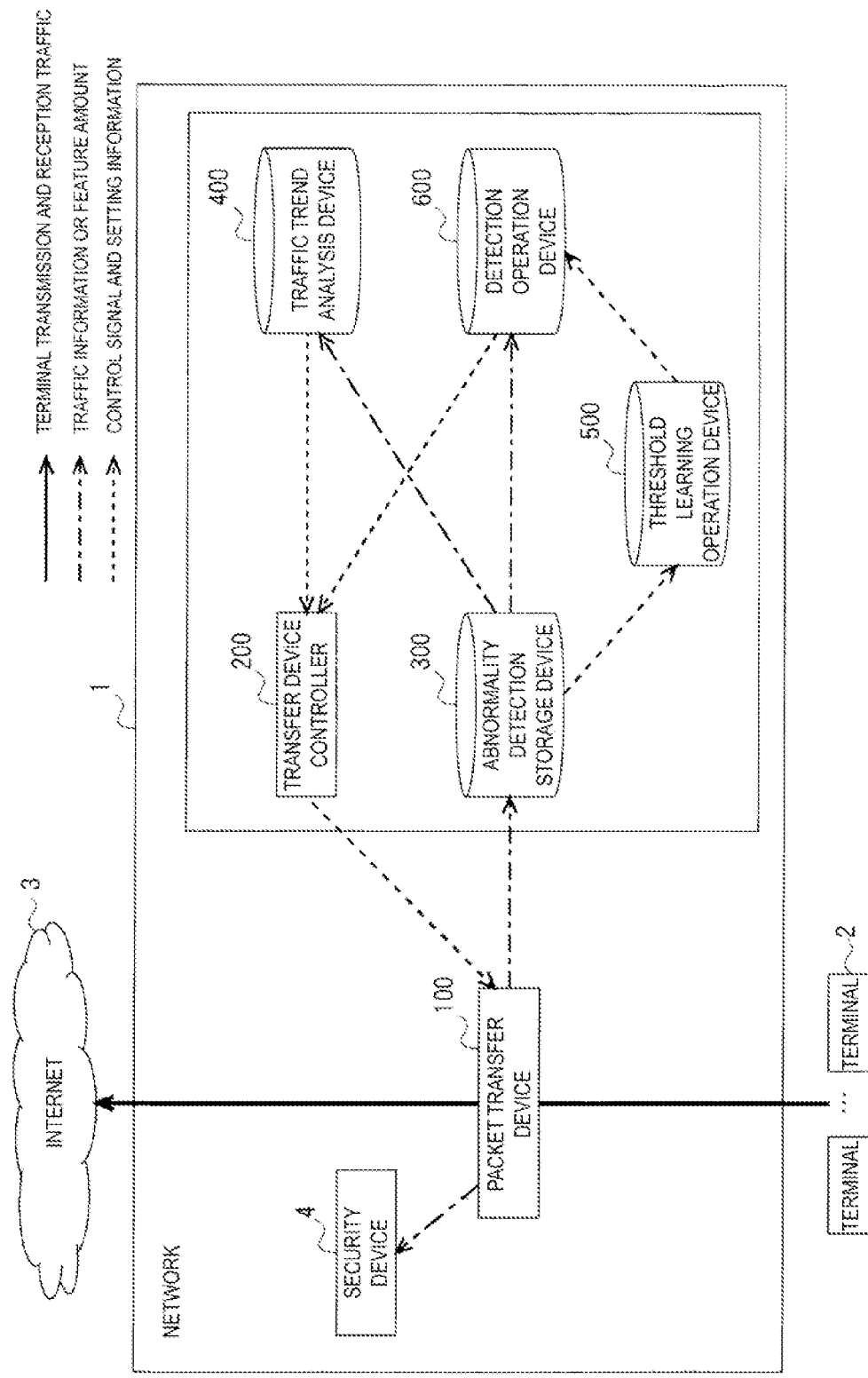
FIG. 5 illustrates an example of a network configuration of an infection-spreading attack detection system.

Next, an infection-spreading attack detection system according to one embodiment of the present invention will be described with reference to FIG. 5. FIG. 5 illustrates an example of a network configuration of an infection-spreading attack detection system. As illustrated in FIG. 5, a large number of terminals 2 are accommodated in a network 1 such as a carrier network. The network 1 is a large scale IP network to which multiple terminals 2 are connected. Communication characteristics (such as communication frequency, destination number, and packet size, for example) of the terminal 2 are not particularly limited. The terminal 2 is not limited to terminals operated by users, but may also include IoT terminals. The type of line connecting the terminal 2 and the network 1 to each other is not particularly limited and may be a wireless communication line or a wired communication line. The network 1 is connected to the Internet 3. An operator of the network 1 provides a connection service to the Internet 3, for the terminals 2. A packet transfer device 100 is provided in the network 1.

The packet transfer device 100 is a device for relaying packets between the Internet 3 and the terminals 2. An example of the packet transfer device 100 includes a network device such as a router in a core network of a carrier network. The number of packet transfer devices 100 in the network 1 is not particularly limited.

In the present embodiment, an abnormality detection device group is provided including a transfer device controller 200, an abnormality detection storage device 300, a traffic trend analysis device 400, a threshold learning operation device 500, and a detection operation device 600. Here, the abnormality detection storage device 300 corresponds to a "first feature amount derivation unit" and a "second feature amount derivation unit" in the claims. The traffic trend analysis device 400 corresponds to the "monitoring target determination unit" in the claims. Furthermore, the detection operation device 600 corresponds to a "detection unit" in the claims.

How these devices are implemented is not particularly limited. For example, each device may be configured by installing programs on a general purpose server, or each device may be configured as a dedicated hardware device that incorporates a program. Also, for example, the devices may be combined as appropriate to be implemented as one hardware device. Also, for example, each device may be implemented in a virtual machine constructed in a virtual environment.

In the present embodiment, an abnormality detection device group is provided for each packet transfer device 100. Alternatively, one abnormality detection device group may be provided for each set of a plurality of packet transfer devices 100.

When relaying packets, the packet transfer device 100 collects information, such as the number of transmitted/received packets, for each destination address space (such as /eight address spaces for example) by using the ACL, and transfers the information to the abnormality detection storage device 300.

The abnormality detection storage device 300 processes the traffic information for each time sequence into information (first feature amount) used for identifying the set of M partial address space(s) enabling effective detection, and transmits the information to the traffic trend analysis device 400.

The traffic trend analysis device 400 analyzes the first feature amount within a predetermined period and identifies a set of M partial address space(s) enabling effective detection (e.g., M partial address space(s) with the amount of traffic being constantly small) as the monitoring targets. A setting for collecting traffic information among the M address space(s) is input to the packet transfer device 100, via the transfer device controller 200.

After the packet transfer device 100 is thus set, the packet transfer device 100 transmits the traffic information of only the M address space(s) enabling effective detection, to the abnormality detection storage device 300.

The abnormality detection storage device 300 processes the traffic information in each time sequence into information (second feature amount) used for detection, and transmits the information to the threshold learning operation device 500 and the detection operation device 600.

The threshold learning operation device 500 calculates the threshold from the second feature amount in the past time sequence using a statistical or machine learning algorithm.

The detection operation device 600 compares the threshold with the second feature amount of the detection target traffic, performs abnormality detection for each of the M partial address space(s) enabling effective detection, and determines whether the infection-spreading attack is occurring, based on the results of the comprehensive determination on the spaces. When the infection-spreading attack is determined to be occurring, the routing of the packet transfer device 100 is changed via the transfer device controller 200, and the traffic thereafter is input to a predetermined security device 4 to be carefully examined.

Hereinafter, an example of a functional configuration of each device in the abnormality detection device group will be described.

Figure 6:
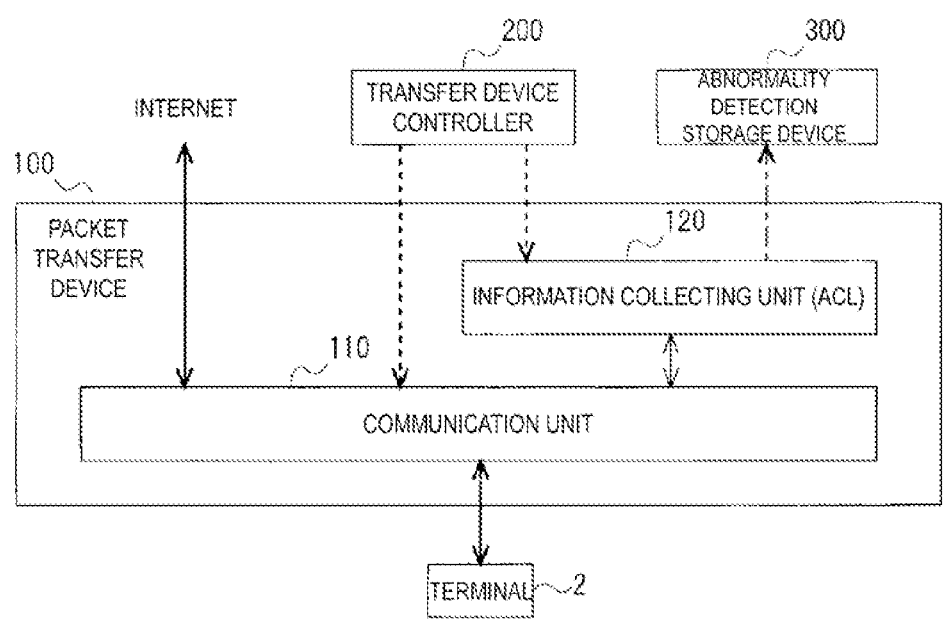
FIG. 6 illustrates an example of a functional configuration of a packet transfer device.

First of all, an example of a functional configuration of the packet transfer device will be described with reference to FIG. 6. As illustrated in FIG. 6, the packet transfer device 100 includes a communication unit 110 that relays the packet transmitted from the terminal 2 to the Internet 3 and relays a packet, directed to the terminal 2, from the Internet 3 to the terminal 2. The packet transfer device 100 includes an information collecting unit 120 that sets a condition for each attribute information (e.g., destination/source IP address) of communication packets to the ACL, to transmit, as the traffic information, a number of packets matching the conditions within a predetermined sampling time to the abnormality detection storage device 300. A plurality of ACLs may be set to each packet transfer device 100, and the application timing of the ACL is not limited to before or after the forwarding. In a hierarchical network, if the setting capacity of the ACL is insufficient, different ACLs can be set to different tiers so that the functions can be distributed. In this case, the location of the setting is not particularly limited. In other words, the packet transfer device 100 that transmits the traffic information for the traffic trend analysis device 400 and the packet transfer device 100 that transmits the traffic information for the threshold learning operation device 500 and the detection operation device 600 do not necessarily be the same.

The setting related to information to be collected in the information collecting unit 120 and the setting related to the routing in the communication unit 110 are determined based on a command from the transfer device controller 200. Note that the traffic information transmitted by the information collecting unit 120 to the abnormality detection storage device 300 is not limited to that described above. For example, IP headers, full capture, and the like may be considered as such information. In the following description, the traffic information transmitted from the information collecting unit 120 to the abnormality detection storage device 300 is assumed to be the number of packets that match the conditions of the ACL.

Figure 7:
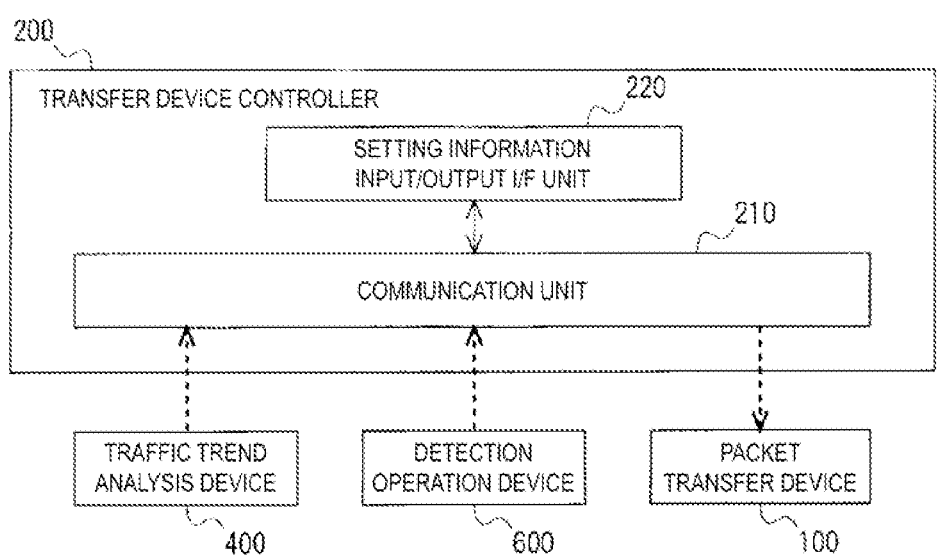
FIG. 7 illustrates an example of a functional configuration of a transfer device controller.

Next, an example of a functional configuration of the transfer device controller will be described with reference to FIG. 7. As illustrated in FIG. 7, the transfer device controller 200 includes a communication unit 210, serving as a communication interface, and a setting information input/output interface unit 220. The setting information input/output interface unit 220 functions as an interface for receiving information related to the setting of the packet transfer device 100 (such as ACL setting information and routing setting information) from the outside of the system (including the traffic trend analysis device 400 and the detection operation device 600), and transmitting the setting to the packet transfer device 100.

Figure 8:
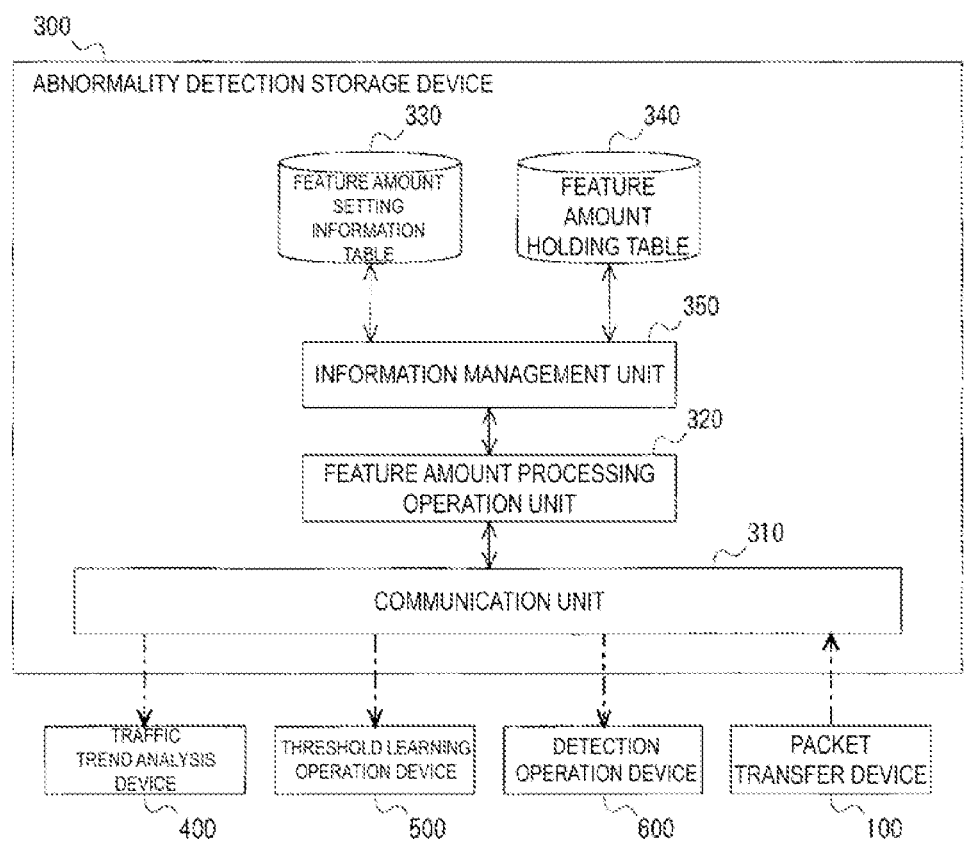
FIG. 8 illustrates an example of a functional configuration of an abnormality detection storage device.

Next, an example of a functional configuration of the abnormality detection storage device will be described with reference to FIG. 8. The abnormality detection storage device 300 includes a communication unit 310 serving as a communication interface, a feature amount processing operation unit 320 that calculates the first feature amount and the second feature amount based on the traffic information acquired from the packet transfer device 100, a feature amount setting table 330 that holds the setting of the feature amount processing, a feature amount holding table 340 that holds the first feature amount or the second feature amount value in the past time sequence, and an information management unit 350 serving as an interface between the feature amount processing operation unit 320 and the tables 330 and 340.

In the present embodiment, the first feature amount and the second feature amount are derived using the same method. Thus, the feature amount setting table 330 and the feature amount holding table 340 are commonly used for the first feature amount and the second feature amount.

As illustrated in the example of FIG. 9, the feature amount setting table 330 holds the time width during which the feature amount processing is executed and a processing method for the information acquired from the packet transfer device 100.

The feature amount holding table 340 is a table that holds, for each time sequence, the first feature amount or the second feature amount acquired for each subdivided partial address space. In the example of FIG. 10, the feature amount holding table 340 stores a number of packets that are first and second feature amounts for each partial address space. Note that, as described above, the value used for the first feature amount and the second feature amount, as well as the unit used therefor, the number of dimensions, and the like are not particularly limited. In the example of FIG. 10, an example is illustrated in which one table is created for each packet transfer device 100. Alternatively, the information acquired from the plurality of packet transfer devices 100 may be stored for each packet transfer device 100. The information held in the feature amount holding table 340 is used in the traffic trend analysis device 400, the threshold learning operation device 500, and the detection operation device 600.

Figure 11:
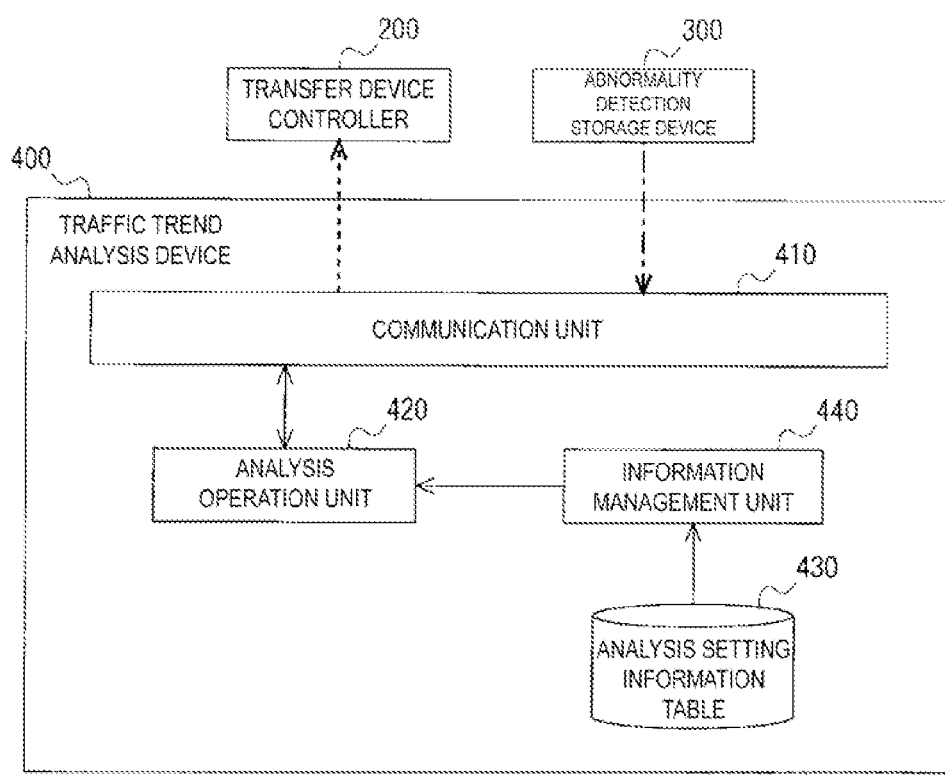
FIG. 11 illustrates an example of a functional configuration of a traffic trend analysis device.

Next, an example of the functional configuration of the traffic trend analysis device 400 will be described with reference to FIG. 11. As illustrated in FIG. 11, the traffic trend analysis device 400 includes a communication unit 410 serving as a communication interface, an analysis operation unit 420 that performs analysis based on the first feature amount acquired from the abnormality detection storage device 300 and identifies a group of address spaces enabling effective detection (e.g., address spaces with a small amount of traffic) as a monitoring target, an analysis setting information table 430 that holds various setting information used in the analysis processing by the analysis operation unit 420, and an information management unit 440 serving as an interface between the analysis operation unit 420 and the analysis setting information table 430. The analysis operation unit 420 performs analysis on the information (e.g., M partial address space(s) with a small amount of traffic) for acquiring the traffic information required for deriving the second feature amount in the packet transfer device 100.

The analysis setting information table 430 holds the various setting information required in the analysis processing described above. Specifically, as illustrated in the example of FIG. 12, the analysis setting information table 430 holds information such as a method for identifying a partial address space with a small amount of traffic, a threshold of the amount of traffic, and a number of partial address spaces for abnormal detection.

Here, the threshold X of the traffic amount is an example of a parameter defining the group of partial address spaces enabling effective detection. In this example, an address space constantly falling below the threshold X of the amount of traffic is identified as an address space enabling effective detection. The threshold X can be calculated, for example, based on the amount of attack to be detected (example: target value of the number of infected terminals×amount of attack per infected terminal), distribution of attacks (e.g., a uniform distribution or a distribution with nonuniformity among a plurality of address spaces), and the like.

Note that in the above-described procedure 2, the abnormality detection does not necessarily need to be executed on all the address spaces falling below the threshold X. In this case, for example, the parameter M may be determined explicitly, and the number of address spaces for which the abnormality detection is performed may be ultimately specified. In FIG. 12, an example is illustrated in which the user sets the threshold X. Alternatively, a clustering algorithm such as K-Means may be employed to identify the group of address spaces enabling effective detection.

Figure 13:
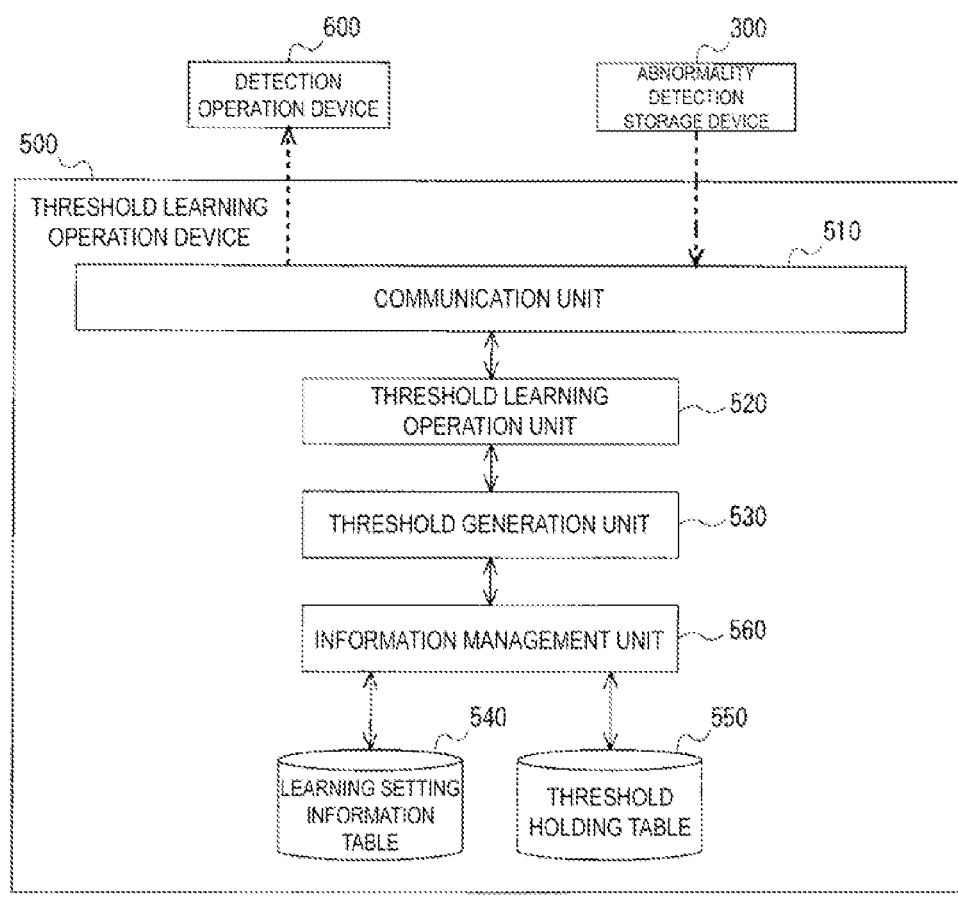
FIG. 13 illustrates an example of a functional configuration of a threshold learning operation device.

Next, an example of a functional configuration of the threshold learning operation device will be described with reference to FIG. 13. As illustrated in FIG. 13, the threshold learning operation device 500 includes a communication unit 510, a threshold learning operation unit 520, a threshold generation unit 530, a learning setting information table 540, a threshold holding table 550, and an information management unit 560. The communication unit 510 serves as a communication interface. The threshold learning operation unit 520 acquires the second feature amount in the past time sequence from the abnormality detection storage device 300, and performs an operation of learning the threshold based on the acquired second feature amount of the previous time sequence. The threshold generation unit 530 generates a threshold based on the learning information. The learning setting information table 540 holds various configuration information used in threshold calculation processing (such as a statistical method and a machine learning algorithm, for example). The threshold holding table 550 holds the threshold generated. The information management unit 560 serves as an interface between the threshold generation unit 530 and the tables 540 and 550. The calculated threshold is transmitted to the detection operation device 600.

As illustrated in the example of FIG. 14, the threshold holding table 550 holds the threshold of each time sequence acquired from the threshold generation unit 530 for each predetermined unit (i.e., each of the M partial address space(s)) for which the second feature amount has been generated. This threshold may be the same or different among time sequences. The number of dimensions of the threshold is not particularly limited.

As illustrated in the example of FIG. 15, the learning setting information table 540 is a table that holds the type of algorithm used for abnormality detection, a hyperparameter value, and the number of time sequences used for learning acquired from the abnormality detection controller device. The type of detection algorithm is not particularly limited. An outlier as a result of statistically calculating quadrants value may be used as a threshold, or a machine learning approach, such as One Class SVM, may be used to calculate the threshold. These pieces of setting information are transmitted to the threshold learning operation unit 520.

Figure 16:
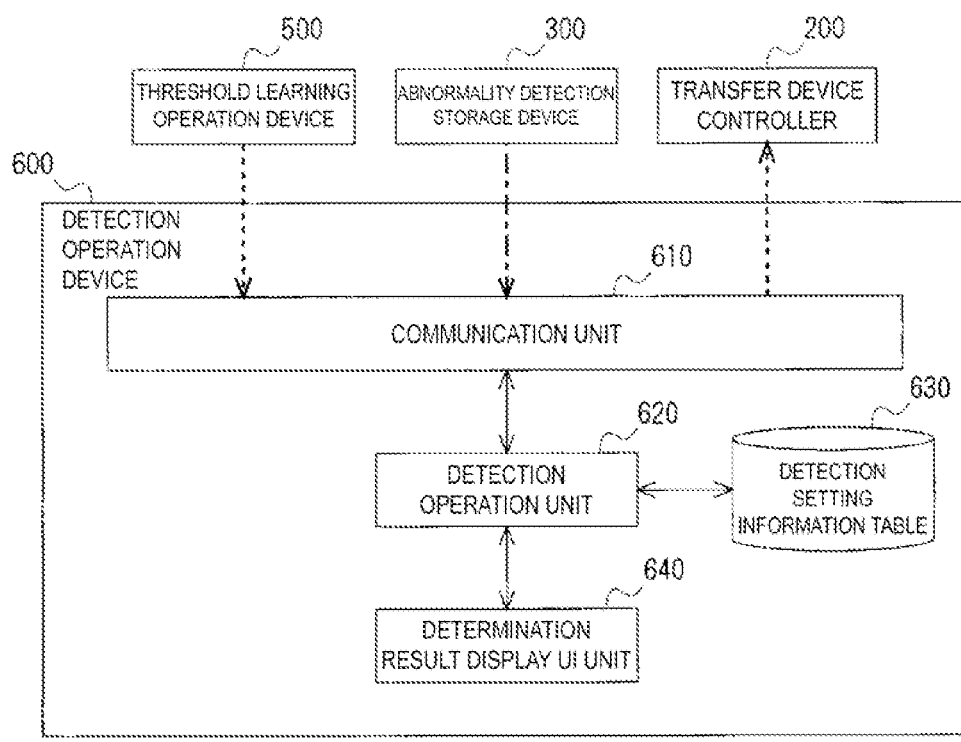
FIG. 16 illustrates an example of a functional configuration of a detection operation device.

Next, an example of a functional configuration of the detection operation device will be described with reference to FIG. 16. As illustrated in FIG. 16, the detection operation device 600 includes a communication unit 610 serving as a communication interface, a detection operation unit 620 configured to determine whether the infection-spreading attack has occurred, a detection setting information table 630 that holds setting information used in the detection operation unit 620, and a determination result display user interface unit 640 that displays a determination result. The detection operation unit 620 acquires the second feature amount of the present time sequence of the traffic in the M partial address space(s) from the abnormality detection storage device 300, and receives information on the threshold calculated from the traffic in the past time sequence from the threshold learning operation device 500. The detection operation unit 620 determines whether each of the partial address spaces is normal or abnormal, based on the second feature amount and the threshold acquired. Furthermore, the detection operation unit 620 refers to information (such as values of M and N) of the detection setting information table 630, and performs comprehensive attack determination. The result of the determination is transmitted to the transfer device controller 200.

FIG. 17 illustrates an example of the data held in the detection setting information table 630. In FIG. 17, the parameter M is a number of partial address spaces for abnormal detection. The parameter M is a predetermined constant or a number calculated by the traffic trend analysis device 400, and is also held in the traffic trend analysis device 400. The parameter N is a parameter used for comprehensive determination on the result of abnormal detection for the M partial address space. The detection operation unit 620 determines that the infection-spreading attack is occurring when abnormality is detected in N address spaces or more, where ($\leq$M), among the M address intervals, for example. A method of deriving the value of the parameter N is not particularly limited. The value can be determined empirically from a tolerable error detection rate acceptable in the present invention, or can be analytically derived by defining the noise occurrence rate in normal communication in a single address space and calculating the probability of noise occurring simultaneously in a plurality of address spaces.

Figure 18:
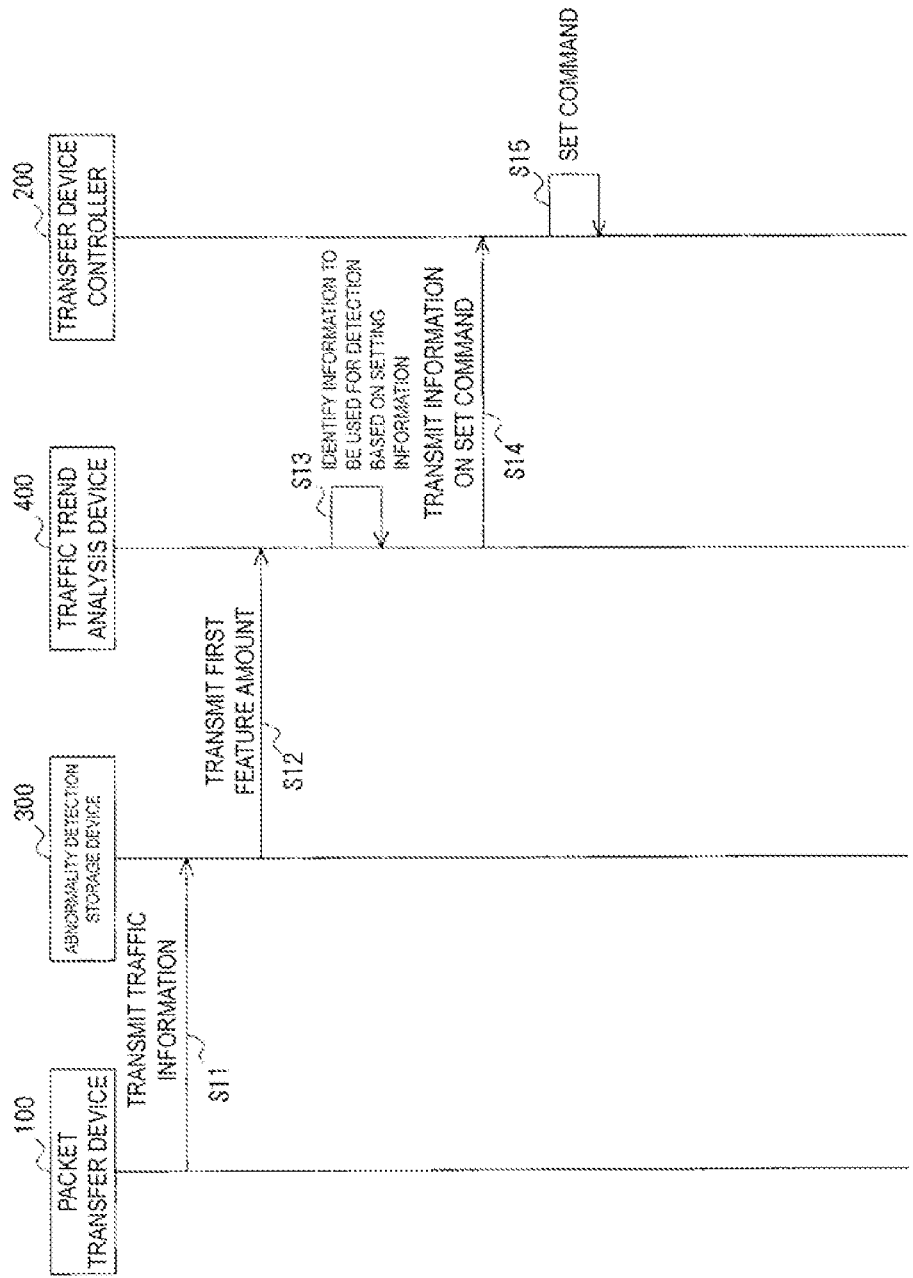
FIG. 18 illustrates a sequence related to traffic trend analysis.
Figure 19:
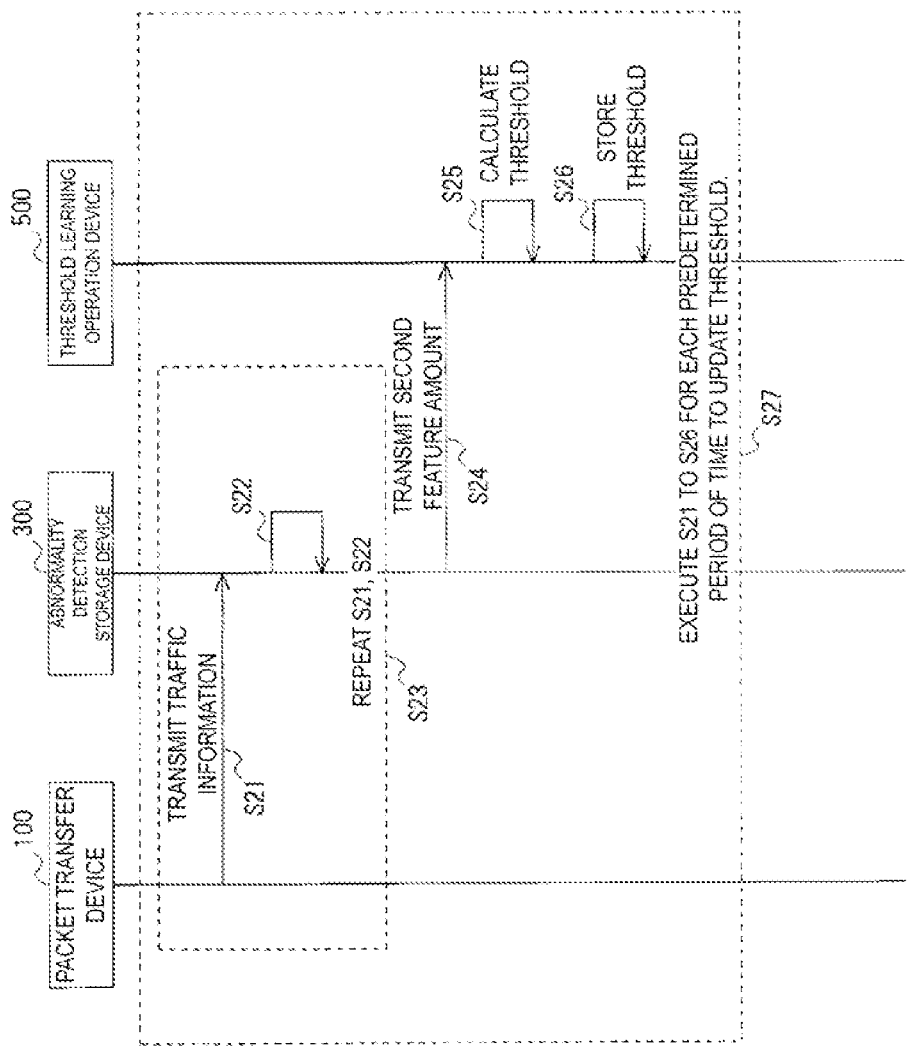
FIG. 19 illustrates a sequence related to threshold learning.
Figure 20:
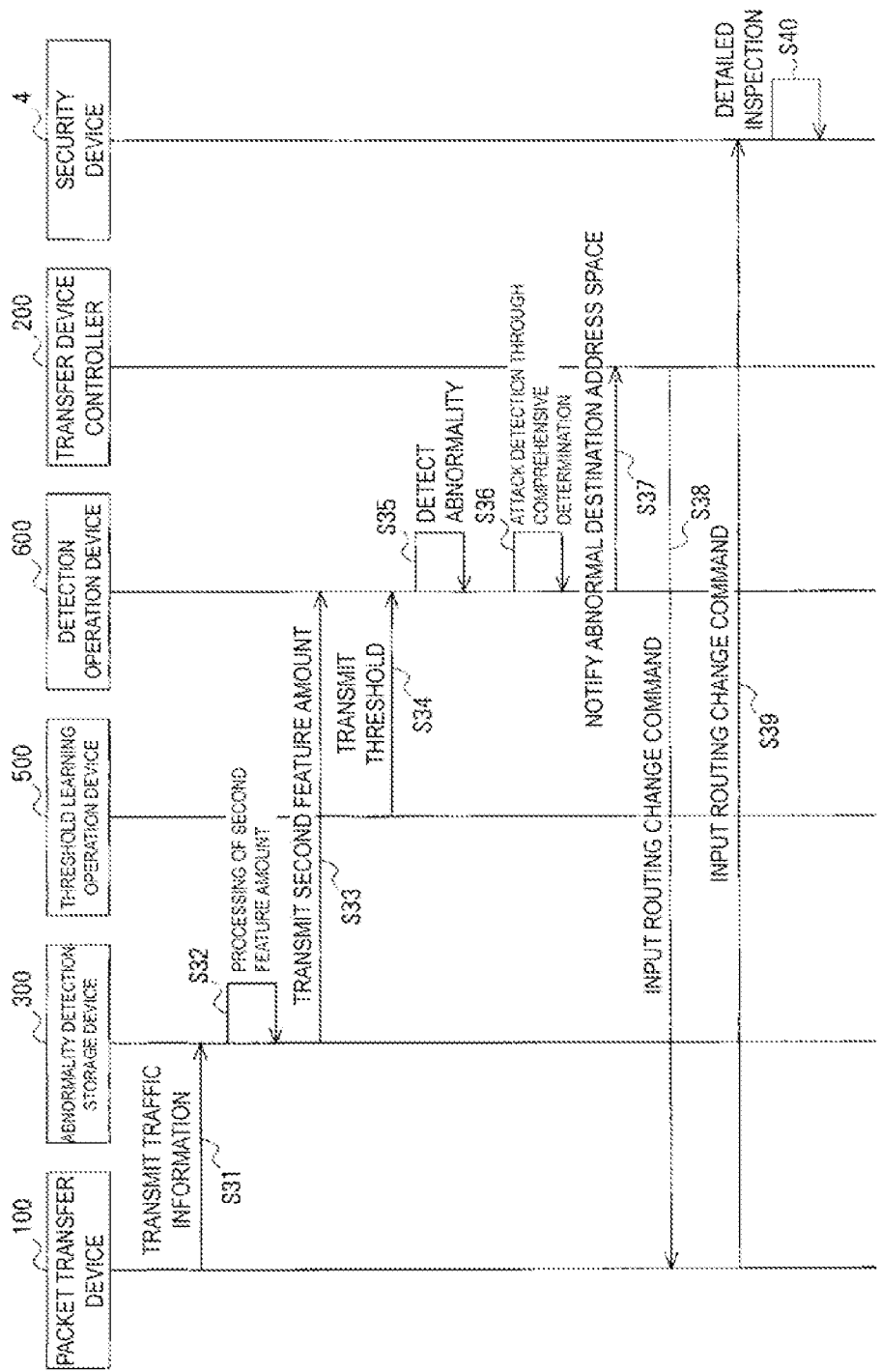
FIG. 20 illustrates a sequence related to a detection and measurement against abnormality.

Next, operations of the infection-spreading attack detection system according to the present embodiment will be described with reference to FIGS. 18 to 20. First of all, a sequence related to the traffic trend analysis will be described with reference to a sequence chart in FIG. 18.

In this sequence, in the network configuration illustrated in FIG. 5, the abnormality detection storage device 300 acquires, from the packet processing device 100, the traffic information at a predetermined fixed time interval for each subdivided address space (step S11). The acquired traffic information is accumulated in the abnormality detection storage device 300 for a plurality of time widths, and the accumulated information is analyzed by the traffic trend analysis device 400 to identify the group of M partial address space enabling the infection-spreading attack to be accurately detected (steps S12 and S13).

The transfer device controller 200 sets a command for acquiring information (traffic information on which the second feature amount is based) usable for the detection from the M partial address space(s), to the plurality of network transfer devices 100, so that abnormality within the carrier network can be comprehensively detected (steps S14 and S15).

Next, a sequence related to the threshold learning will be described with reference to a sequence chart in FIG. 19.

In this sequence, in the network configuration illustrated in FIG. 5, the abnormality detection storage device 300 acquires, from the packet transfer device 100, the traffic information at a predetermined fixed time interval (e.g., 20 minutes interval) for each of the subdivided M partial address space(s) (step S21). The acquired traffic information is stored in the abnormality detection storage device 300 and processed to be the second feature amount through a predetermined operation (step S22). The second feature amount of the respective time sequences generated by repeating the processing described above for a plurality of number of times (e.g., 100 times) (step S23) are input to a statistical or machine learning algorithm. Thus, a threshold is obtained for each of the M subdivided partial address space(s) (steps S24, S25, and S26). Because the trend of traffic is assumed to vary periodically, this sequence is conducted once in every predetermined period of time (e.g., once a month) to update the threshold (step S27).

Next, a sequence related to detection of/measure against abnormality will be described with reference to a sequence chart in FIG. 20.

In this sequence, in the network configuration illustrated in FIG. 5, the abnormality detection storage device 300 acquires, from the packet transfer device 100, the traffic information at a predetermined fixed time interval (e.g., 20 minutes interval) for each of the subdivided M partial address space(s) (step S31). The acquired traffic information is stored in the abnormality detection storage device 300 and processed to be the second feature amount through a predetermined operation (step S32). Through an operation such as comparison using the second feature amount derived by the processing and the threshold acquired in the threshold learning sequence (steps S33 and S34), whether each of the M subdivided partial address space(s) is normal or abnormal is determined (step S35, procedure 1 in FIG. 1).

Next, as in the procedure 2 in FIG. 1, by comprehensively evaluating the detection results for the M partial address space(s), whether the infection-spreading attack from the terminal 2 is occurring in the network 1 is determined (step S36). When it is determined that the infection-spreading attack is occurring, the routing of the packet transfer device 100 is changed via the transfer device controller 200 (steps S37, S38), the communications with the M partial address space(s) are led to the security device 4 (step S39), and infected terminal identification is performed on the terminal to terminal basis (step S40).

As described above, according to the infection-spreading attack detection system according to the present embodiment, the partial address spaces are narrowed down to the M partial address space(s) to be the monitoring targets based on the first feature amount derived from the traffic information. Then, for each of the M second feature amount derived from the traffic information of the respective partial address spaces narrowed down, whether the detection condition is satisfied is determined. Whether the infection-spreading attack has occurred is determined by evaluating the results of the determination. Thus, the occurrence of erroneous detection can be reduced as long as no noise occurs simultaneously in a plurality of partial address spaces. Thus, the infection-spreading attack detection system according to the present embodiment can detect the occurrence of the infection-spreading attack with high accuracy.

One embodiment of the present invention has been described in detail above, but the present invention is not limited thereto. For example, in the embodiment described above, the amount derivation unit for the first feature amount for identifying the M partial address space(s) and the amount derivation unit for the second feature amount used for detecting the infection-spreading attack are implemented in the abnormality detection storage device 300. Alternatively, these units may both be implemented as different devices.

In the above-described embodiment, the setting processing for the packet transfer device 100 is performed by the transfer device controller 200. Alternatively, the traffic trend analysis device 400 and the detection operation device 600 may directly set the packet processing device 100.

While IPv4 is described as an example of the address space in the above-described embodiment, the present invention can be applied to other address spaces such as IPv6.

REFERENCE SIGNS LIST

1 . . . Network
2 . . . Terminal
3 . . . Internet
4 . . . Security device
100 . . . Packet transfer device
200 . . . Transfer device controller
300 . . . Abnormality detection storage device
400 . . . Traffic trend analysis device
500 . . . Threshold learning operation device
600 . . . Detection operation device

The invention claimed is:

1. An infection-spreading attack detection system for detecting an occurrence of an infection-spreading attack in a network including a transfer device that transfers a packet, the infection-spreading attack detection system comprising:
a first feature amount derivation unit, including one or more hardware processors, configured to acquire first traffic information on the packet transferred by the transfer device, and to derive based on the first traffic information a first feature amount of traffic for each of a plurality of partial address spaces formed by subdividing an address space of the packet;
a monitoring target determination unit, including one or more hardware processors, configured to determine based on the first feature amount derived by the first feature amount derivation unit M partial address space(s) to be a monitoring target out of the partial address spaces;
a second feature amount derivation unit, including one or more hardware processors, configured to acquire second traffic information on the packet transferred by the transfer device having, as a destination or a source, an address within the M partial address space(s) determined by the monitoring target determination unit, and to derive based on the second traffic information a second feature amount of the traffic for each of the M partial address space(s); and
a detection unit, including one or more hardware processors, configured to determine whether the second feature amount derived by the second feature amount derivation unit satisfies a predetermined detection condition for each of the M partial address space(s), and, by evaluating M determination results to determine whether an infection-spreading attack has occurred.

2. The infection-spreading attack detection system according to claim 1, wherein the detection unit is configured to determine that the infection-spreading attack has occurred in the partial address spaces satisfying the detection conditions when a number of the partial address spaces satisfying the detection condition is equal to or larger than a predetermined threshold N, where (N≤M).

3. The infection-spreading attack detection system according to claim 1, wherein the monitoring target determination unit is configured to determine based on the first feature amount predetermined M partial address space(s) having a relative small amount of traffic to be a monitoring target.

4. The infection-spreading attack detection system according to claim 1, wherein the monitoring target determination unit is configured to determine based on the first feature amount and a relative or absolute threshold M partial address space(s) to be a monitoring target.

5. The infection-spreading attack detection system according to claim 1, wherein the monitoring target determination unit is configured to set an access control list to the transfer device for acquiring the second traffic information by the transfer device.

6. The infection-spreading attack detection system according to claim 1, wherein the detection unit is configured to, when an infection-spreading attack is determined to have occurred, set the transfer device to transfer the packet having, as a destination or a source, an address within the M partial address space(s) to a predetermined security device.

7. An infection-spreading attack detection method of detecting an occurrence of an infection-spreading attack in a network including a transfer device that transfers a packet, the method comprising:

acquiring, by a first feature amount derivation unit, first traffic information on the packet transferred by the transfer device, and deriving based on the first traffic information a first feature amount of traffic for each of a plurality of partial address spaces formed by subdividing an address space of the packet;

determining, by a monitoring target determination unit, based on the first feature amount derived by the first feature amount derivation unit M partial address space(s) to be a monitoring target out of the plurality of partial address spaces;

acquiring, by a second feature amount derivation unit, second traffic information on the packet transferred by the transfer device having as a destination or a source, an address within the M partial address space(s) determined by the monitoring target determination unit, and deriving based on the second traffic information a second feature amount of the traffic for each of the M partial address space(s); and determining, by a detection unit, whether the second feature amount derived by the second feature amount derivation unit satisfies a predetermined detection condition for each of the M partial address space(s), and, by evaluating M determination results, determining whether an infection-spreading attack has occurred.

8. The infection-spreading attack detection method according to claim 7, further comprising:

determining, by the detection unit, that the infection-spreading attack has occurred in the partial address spaces satisfying the detection conditions when a number of the partial address spaces satisfying the detection condition is equal to or larger than a predetermined threshold N, where (N≤M).

9. The infection-spreading attack detection method according to claim 7, further comprising:

determining, by the monitoring target determination unit, based on the first feature amount predetermined M partial address space(s) having a relative small amount of traffic to be a monitoring target.

10. The infection-spreading attack detection method according to claim 7, further comprising:

determining, by the monitoring target determination unit, based on the first feature amount and a relative or absolute threshold M partial address space(s) to be a monitoring target.

11. The infection-spreading attack detection method according to claim 7, further comprising:

setting, by the monitoring target determination unit, an access control list to the transfer device for acquiring the second traffic information by the transfer device.

12. The infection-spreading attack detection method according to claim 7, further comprising:

setting, by the detection unit, when an infection-spreading attack is determined to have occurred, the transfer device to transfer the packet having, as a destination or a source, an address within the M partial address space(s) to a predetermined security device.

13. A non-transitory computer readable medium storing one or more instructions for detecting an occurrence of an infection-spreading attack in a network including a transfer device that transfers a packet, the one or more instructions causing a computer to execute:

acquiring, by a first feature amount derivation unit, first traffic information on the packet transferred by the transfer device, and deriving based on the first traffic information a first feature amount of traffic for each of a plurality of partial address spaces formed by subdividing an address space of the packet;

determining, by a monitoring target determination unit, based on the first feature amount derived by the first feature amount derivation unit M partial address space(s) to be a monitoring target out of the plurality of partial address spaces;

acquiring, by a second feature amount derivation unit, second traffic information on the packet transferred by the transfer device having as a destination or a source, an address within the M partial address space(s) determined by the monitoring target determination unit, and deriving based on the second traffic information a second feature amount of the traffic for each of the M partial address space(s); and determining, by a detection unit, whether the second feature amount derived by the second feature amount derivation unit satisfies a predetermined detection condition for each of the M partial address space(s), and, by evaluating M determination results, determining whether an infection-spreading attack has occurred.

14. The non-transitory computer readable medium according to claim 13, wherein the one or more instructions further cause the computer to execute:

determining, by the detection unit, that the infection-spreading attack has occurred in the partial address spaces satisfying the detection conditions when a number of the partial address spaces satisfying the detection condition is equal to or larger than a predetermined threshold N, where (N≤M).

15. The non-transitory computer readable medium according to claim 13, wherein the one or more instructions further cause the computer to execute:

determining, by the monitoring target determination unit, based on the first feature amount predetermined M partial address space(s) having a relative small amount of traffic to be a monitoring target.

16. The non-transitory computer readable medium according to claim 13, wherein the one or more instructions further cause the computer to execute:

determining, by the monitoring target determination unit, based on the first feature amount and a relative or absolute threshold M partial address space(s) to be a monitoring target.

17. The non-transitory computer readable medium according to claim 13, wherein the one or more instructions further cause the computer to execute:

setting, by the monitoring target determination unit, an access control list to the transfer device for acquiring the second traffic information by the transfer device.

18. The non-transitory computer readable medium according to claim 13, wherein the one or more instructions further cause the computer to execute:

setting, by the detection unit, when an infection-spreading attack is determined to have occurred, the transfer device to transfer the packet having, as a destination or a source, an address within the M partial address space(s) to a predetermined security device.

* * * * *